United States Patent [19]
Grajewski

[11] Patent Number: 5,266,393
[45] Date of Patent: Nov. 30, 1993

[54] METHOD OF MAKING A FIBER REINFORCED HEAT RECOVERABLE OBJECT

[75] Inventor: Franz Grajewski, Stadthagen, Fed. Rep. of Germany

[73] Assignee: Kabel Metal Electro GmbH, Hanover, Fed. Rep. of Germany

[21] Appl. No.: 888,739

[22] Filed: May 26, 1992

[30] Foreign Application Priority Data

Jun. 14, 1991 [DE] Fed. Rep. of Germany ....... 4119633

[51] Int. Cl.$^5$ ............................................. D03D 13/00
[52] U.S. Cl. ..................................... 428/229; 156/84; 156/85; 264/230; 264/288.4; 264/342 R; 264/342 RE; 428/230; 428/255; 428/257; 428/258; 428/259
[58] Field of Search ........................ 156/307.1, 84, 85; 428/257, 258, 259, 229, 230, 255; 264/342 R, 342 RE, 230, 288.4

[56] References Cited
U.S. PATENT DOCUMENTS
5,141,812 8/1992 Marx et al. ......................... 428/377

Primary Examiner—James J. Bell
Attorney, Agent, or Firm—Ralf H. Siegemund

[57] ABSTRACT

A heat recoverable, shrink-object is made from a mesh or web assembly having thermoplastic threads that extend in a first direction, and second threads that are essentially non-stretchable and run transversely to the first threads, that assembly is embedded in a polymer matrix which is then crosslinked; the thermoplastic threads do not crosslink; the matrix with embedded mesh or web is then heated to a temperature above the crystallite melting point of the polymer matrix and the thermoplastic threads are stretched into an elongated state at that temperature, and the stretching is maintained during subsequent cooling until a lower temperature including room temperature is reached and stretching is no longer needed to maintain said elongated state.

3 Claims, 1 Drawing Sheet

METHOD OF MAKING A FIBER REINFORCED HEAT RECOVERABLE OBJECT

BACKGROUND OF THE INVENTION

The present invention relates to the making and manufacture of a fiber reinforced heat-recoverable object by means of embedding in a matrix of polymer material, a mesh, web, plaid, etc., and being defined by strands or threads of a polymer running in a first direction, and by further strands or threads running transversely thereto and being made of material that is essentially not deformable, at least in comparison with the first mentioned polymer.

Sleeves made of a fiber reinforced material for purposes of covering a cable splice are known, e.g. through European Patent-A2 0 270 132 as well as German Patent A1 38 33 415; corresponding in parts and being included in a more extensive U.S. application by me and others, Ser. No. 379,093 filed Jul. 13, 1989, now U.S. Pat. No. 5,141,812. EP-132 suggests a mesh of shrinkable polymer threads with transversely oriented glass fibers is stretched and embedded in a polymer matrix. The reinforcement is provided here only in the direction of the glass fibers. The other application (US-allowed) suggests the use of a strand of a synthetic material upon which is wound a non-extensible thread, e.g. a glass fiber. Transverse to these strands run glass fibers and the entire arrangement is embedded in a polymer matrix.

In order to render the latter matrix as a whole shrinkable/recoverable, it is necessary to crosslink the matrix and stretch the object in the direction of the strands that carry the glass fiber coiling. During stretching the helical coiling is axially extended even though the thread of which the coil is made is by itself not stretchable. This configuration provides a two-dimensional reinforcement, that is, reinforcement that is effective in two transverse directions and thus in any direction in a plane.

DESCRIPTION OF THE INVENTION

It is an object of the present invention to provide a new and improved method of making a heat recoverable shrinkable object which has the advantages stated above but does not require strands with a helical winding, without deterioration of the tear strength of the resulting product.

It is thus a specific object of the present invention to provide a new and improved method for making a heat recoverable, shrink-object embedded in a polymer matrix, a mesh, plaid, weave, etc., that is comprised of polymer strands or threads that run in one direction, and non-deformable strands or threads in a transverse direction.

In accordance with the preferred embodiment of the invention, the objects and here, particularly, the specific object will be attained by means of a mesh, plaid weave, etc., using thermoplastic threads that extend in the direction of shrinking and stretching and threads that are essentially non-stretchable and run transversely to the first mentioned threads, and this assembly and configuration is embedded in the polymer matrix; having made this basic assembly and configuration, the polymer matrix is now crosslinked, following which the object is heated to a temperature above the crystalline or crystallite melting point of the polymer matrix; while held at that temperature or just maintained thereat, the thermoplastic threads are stretched, and while maintained in the stretched state everything is cooled.

It is believed to be quite a surprising result that in such a configuration the object is tearproof and strong because upon proceeding in the stated manner, it was discovered, the interfaces between the thermoplastic threads and the crosslinked polymer matrix simply forms a barrier that prevents tearing. A complete explanation of this phenomenon cannot be offered at the present time; however it is believed the interface is subjected to surface tension which has a kind of stopping or impeding effect upon a propagating crack or tear; the force in the tear tip is reduced owing to the fact that the reduced layer thickness of the matrix as compared with the thickness (diameter) of the threads. Moreover, eliminating the coiling process described above the mesh, etc., that is made for subsequent embedment can be made considerably cheaper.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows a mesh or web 1 which is embedded in a matrix made of a synthetic material. The mesh or web 1 is comprised of a plurality of parallelly running strands or threads 3 made of a thermoplastic material. In addition, there are transversely running strands or threads 4 made of a material that is essentially non-stretchable. The stretchability is significantly less than that of the thermoplastic threads 3. Threads 4 are, for example, made of cotton, metal, glass, ceramic or the like, e.g. certain high strength synthetics having a much higher softening temperature than that of the thermoplastic threads 3. Thus the threads 4 can be made, e.g. of polyamid, polyaramid, polyester, etc.

Figure 2:
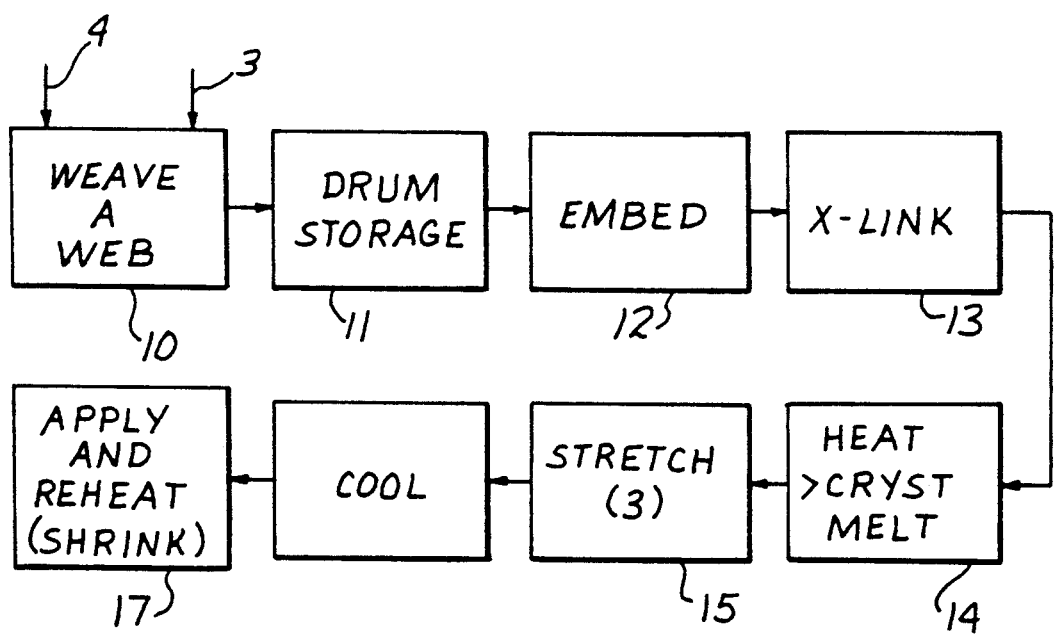
FIG. 2 is a process diagram explaining the inventive process and method.

Proceeding now to FIG. 2, first the mesh or web 1 is made, e.g. by way of weaving using the threads 3 and 4, block 10 of the process diagram. Care must be taken here that there remains a sufficiently large space between the individual threads 3 as well as between the threads 4. This is important because sufficient space must remain around the threads, and the mesh and web openings must be sufficiently large so that synthetic matrix material can later pass through and in effect penetrate the mesh without leaving voids. The mesh so constructed is suitably stored (block 11), e.g. on a drum or spool and subsequently paid from that drum or spool.

Next, as per block 12, the web or mesh is embedded in a polymer to obtain an embedding matrix. One will use here an appropriate laminating or ribbon or strip making (casting, extruding) machine. The laminating or casting device embeds the mesh continuously in the polymer matrix material. The threads 3 are made of a thermoplastic material, e.g. polyethylene which will be softened during embedding. In this manner one obtains a sufficient bond between the polymer of the embedding matrix and the thermoplastic threads. The matrix material may also be comprised of, at least to a significant extent, polyethylene.

In the next step, 13, the matrix material is crosslinked. In order to attain this, the material used here is preferably silane grafted polyethylene. Such grafted-on silane groups will subsequently crosslink in the presence of moisture. For example, the material with embedded mesh is exposed to steam, i.e. water vapor at a temperature of about 90° C. Following the crosslinking, the object is heated, step 14, to a temperature above the crystallite melting point of the matrix material. Of course, the temperature must remain below the decomposition and charring temperature of the crosslinked material.

Figure 1:
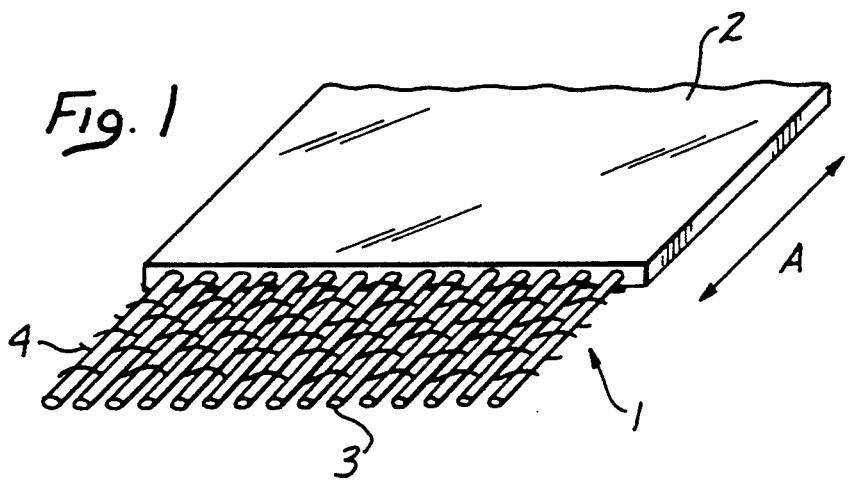
FIG. 1 is a perspective, partially peeled away and section view through a ribbon made in accordance with the preferred embodiment of the present invention.

Having heated the object it is stretched in the direction of extension of the thermoplastic threads 3, step 15. This direction is indicated as arrow A in FIG. 1. The extension and stretching should be by about 300 to 400%. In the next process stage but using the same equipment, the heating is stopped and preferably replaced by active cooling, step 16, while the stretching force is continued to be applied until the cooling has progressed sufficiently so that the extended state is "frozen" into the object, it remains extended without further application of any stretching force.

Finally, step 17, that is after being placed in situ of the respective application, the object is reheated again above the crystallite melting point but without decomposing, will shrink to its former dimensions or at least tend to, but may not be able to, so that a permanent force holds the object onto whatever it has been shrunk upon.

The heat recoverable object thus made has a high tensile strength in a direction transverse to the direction(s) of stretching and shrinking. This high tensile strength still obtains at the temperature of 130° C. which is, e.g. the L shrinking temperature. On the other hand, the tensile strength is not very high in these directions of stretching and shrinking. However, the tear strength in that direction is obtained by the above mentioned phenomenon related specifically to the interface between the crosslinked matrix 2 and the un-crosslinked thermoplastic threads 3. Any crack or tear can at most propagate only to the next interface between crosslinked matrix and un-crosslinked thermoplastic thread material. As stated, it is assumed that there are surface tensions in these interfaces which impede the progress of the tear. Also, the force in the tear tip reduces on account of the reduction of the matrix layer thickness between the threads, in comparison to the thickness of the threads 3.

In the following a specific example will be given which has been practiced with advantage. One begins with a plurality of threads which are extruded from a charge of polyethylene. The threads may have a diameter of 1.3 mm which is about 3/64". A plurality of such threads are used as woof threads, and plural glass fibers of similar diameter (1.3 mm) are used as warp threads in a weaving machine so as to obtain a woven mesh or web. The spacing between the threads in each instance was also 1.3 mm.

The mesh or web above was then embedded in a synthetic material using an appropriate lining and laminating machine. The matrix material had the following composition (all parts by weight):

50 parts LLDPE (linear low density polyethylene) having e.g. a density of 0.93 g/cm$^3$
50 pts ethylene-vinyl-acetate
1.5 pts vinyltrimethoxisilane
0.02 pts peroxide
0.05 pts dibutyltindilaurate The thus provided laminate had a wall thickness of 4 mm. After the mesh was embedded in the matrix polymer a ribbon resulted from which suitable lengths were cut, e.g. for making sleeves. These individual pieces were then placed into a moist atmosphere in order to obtain the desired crosslinking. Thereafter the objects were heated to about 130° to 150° C. and then the entire object was stretched and expanded in the direction of the polymer threads 3 by about 400%. While the stretched state was maintained the object was cooled to room temperature. The resulting object is now heat-recoverable when placed on another object. The object may be provided with a hot melting adhesive or may be coated thermochromatically.

The invention is not limited to the embodiments described above but all changes and modifications thereof, not constituting departures from the spirit and scope of the invention, are intended to be included.

I claim:

1. method for making a heat recoverable, shrink-object comprising:
   providing a mesh or web assembly having first, thermoplastic threads that extend in a first direction without having a helical coiling of an unstretchable material about them, the assembly further having second threads that are essentially non-stretchable and run transversely to the first, thermoplastic threads;
   embedding said assembly in a polymer matrix to obtain an object;
   causing the polymer of the matrix to crosslink, the first thermoplastic threads do not crosslink so that a tear resisting interface is established between the crosslinked matrix and the un-crosslinked first threads;
   heating the matrix with embedded mesh to a temperature above the crystallite melting point of the polymer matrix;
   stretching the object including the first thermoplastic threads into an elongated state in the first direction of extension of the thermoplastic threads while maintaining said temperature; and
   maintaining the stretching during a subsequent cooling to a lower temperature, including room temperature, so that stretching is no longer needed to maintain the object in said elongated state, there being no unstretchable threads in the object that extend in the first direction and the essentially unstretchable second threads remain in the matrix.

2. Method as in claim 1 wherein the providing step includes weaving the first and second threads.

3. A heat recoverable, shrink-object comprising:
   a mesh or web assembly having first, thermoplastic threads that extend in a first direction, without having a helical coiling of an unstretchable material, the assembly further having second threads that are essentially non-stretchable and extend transverse to the first threads;
   a polymer matrix embedding said assembly;
   the polymer of the matrix having been crosslinked when embedding, the thermoplastic of the thermoplastic first threads not being crosslinked so that a tear resisting interface is established between the crosslinked matrix and the un-crosslinked first threads; and the object having been stretched into an elongated state at a temperature above the crystallite temperature of the embedding polymer matrix the stretching having been maintained during subsequent cooling, there being no unstretchable threads in the object that extend in the first direction, the essentially unstretchable second threads remain in the matrix.

* * * * *